United States Patent
Kang et al.

(10) Patent No.: US 8,928,996 B2
(45) Date of Patent: Jan. 6, 2015

(54) LENS BARREL ASSEMBLY AND PHOTOGRAPHING APPARATUS HAVING THE SAME

(71) Applicant: Samsung Electronics Co., Ltd., Suwon-si (KR)

(72) Inventors: Yoon-seok Kang, Seoul (KR); Min-hyuk Nam, Seoul (KR); Hee-seung Choi, Gunpo-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/014,651

(22) Filed: Aug. 30, 2013

(65) Prior Publication Data
US 2014/0253793 A1    Sep. 11, 2014

(30) Foreign Application Priority Data
Mar. 5, 2013 (KR) .................. 10-2013-0023576

(51) Int. Cl.
*G02B 15/14* (2006.01)

(52) U.S. Cl.
USPC .......................................... 359/700; 359/704

(58) Field of Classification Search
USPC ................. 359/694–704, 811–830
See application file for complete search history.

(56) References Cited

U.S. PATENT DOCUMENTS

| 6,580,566 | B1 | 6/2003 | Kamoda | |
|---|---|---|---|---|
| 8,358,472 | B2 * | 1/2013 | Nagao | 359/700 |
| 8,379,330 | B2 * | 2/2013 | Sasaki | 359/817 |
| 2007/0195429 | A1 | 8/2007 | Kobayashi | |
| 2011/0038059 | A1 | 2/2011 | Oya | |
| 2011/0158621 | A1 * | 6/2011 | Honsho et al. | 396/55 |
| 2011/0188135 | A1 | 8/2011 | Ishigami | |
| 2012/0044580 | A1 | 2/2012 | Suzuki | |
| 2012/0206821 | A1 | 8/2012 | Lee et al. | |

FOREIGN PATENT DOCUMENTS

| JP | 2008-003272 A | 1/2008 |
|---|---|---|
| JP | 2011-158792 A | 8/2011 |
| KR | 10-2012-0092422 A | 8/2012 |

OTHER PUBLICATIONS

Extended European Search Report issued for EP 13195934.8 (May 9, 2014).
PCT Search Report and Written Opinion issued for PCT/KR2013/010782 (Mar. 20, 2014).

* cited by examiner

*Primary Examiner* — Mohammed Hasan
(74) *Attorney, Agent, or Firm* — Drinker Biddle & Reath LLP

(57) ABSTRACT

A lens barrel assembly, which has improved shock resistance and quickly resumes normal operation when external shock is applied, includes a first barrel including an elastic moving pin which protrudes toward a second barrel and elastically deforms. The second barrel includes a first guide groove into which the elastic moving pin is inserted and which extends obliquely in a circumferential direction to guide a movement of the first barrel, and at least one second guide groove including an end separated from the first guide groove and another end connected to the first guide groove to guide the elastic moving pin so that the elastic moving pin returns into the first guide groove when the elastic moving pin is separated from the first guide groove. The second barrel rotates in an optical axis direction and supports the first barrel so that the first barrel moves relative to the optical axis direction.

21 Claims, 15 Drawing Sheets

LENS BARREL ASSEMBLY AND PHOTOGRAPHING APPARATUS HAVING THE SAME

CROSS-REFERENCE TO RELATED PATENT APPLICATION

This application claims the priority benefit of Korean Patent Application No. 10-2013-0023576, filed on Mar. 5, 2013, in the Korean Intellectual Property Office, the disclosure of which is incorporated herein in its entirety by reference.

BACKGROUND

1. Field

Various embodiments of the invention relate to a lens barrel assembly and a photographing apparatus having the same, and more particularly, to a lens barrel assembly having improved shock resistance and a photographing apparatus having the same.

2. Related Art

A lens barrel assembly installed in a photographing apparatus, such as a digital camera, a camcorder, or the like, adjusts a gap between lens groups to achieve an optical system having various focal lengths. Since the optical system of a camera may be converted into a wide-angle lens or a telephoto lens by using the lens barrel assembly, a user may take photographs with various viewing angles while standing still at the same spot. To do so, the lens barrel assembly includes a lens barrel, which supports a lens group, and a cam barrel, which supports the lens barrel, to move the lens barrel in an optical axis direction.

Since positions of the lens barrel and the cam barrel are not fixed but are supported to be relatively movable, the lens barrel assembly is weak to external shock. For example, the user may inadvertently drop the lens barrel assembly or a photographing apparatus having the lens barrel assembly. In this case, shock is applied to the lens barrel, which is exposed to the outside, and thus the lens barrel is forcibly inserted into the cam barrel. As a result, the lens barrel assembly does not operate normally or a moving pin connecting the lens barrel and the cam barrel to each other is damaged.

SUMMARY

Various embodiments provide a lens barrel assembly having improved shock resistance and a photographing apparatus having the same.

Various embodiments also provide a lens barrel assembly which quickly resumes normal operation through a simple control even when external shock is applied thereto and a photographing apparatus having the same.

According to an embodiment, a lens barrel assembly includes a first barrel and a second barrel. The first barrel includes at least one elastic moving pin protruding toward the second barrel and elastically deforms. The second barrel includes a first guide groove into which the at least one elastic moving pin is inserted and which obliquely extends in a circumferential direction to guide a movement of the first barrel, and at least one second guide groove including a first end separated from the first guide groove and a second end connected to the first guide groove to guide the at least one elastic moving pin so that the at least one elastic moving pin returns into the first guide groove when the at least one elastic moving pin is separated from the first guide groove. The second barrel rotates in an optical axis direction and supports the first barrel so that the first barrel relatively moves in an optical axis direction.

The elastic moving pin may include: a body portion which is installed in the first barrel to be fixed in the first barrel and includes a housing groove; a protrusion which is inserted into the housing groove and includes a portion protruding outside the body portion; and an elastic portion which is disposed between the body portion and the protrusion.

The at least one second guide groove may include a first area into which the at least one elastic moving pin separated from the first guide groove is inserted, and a second area which guides the at least one elastic moving pin inserted into the first area to the first guide groove.

An end of the first area may be separated from the first guide groove, and an end of the second area may be connected to the first guide groove.

The first area may include a plurality of sub guide grooves which extend in a direction intersecting with the optical axis direction.

First ends of the plurality of sub guide grooves may be separated from the first guide groove, and second ends of the plurality of sub guide grooves may be connected to the second area.

The second area may extend in parallel with the circumferential direction.

The first area may include a single sub guide groove which extends in parallel with an optical axis.

The single sub guide groove may include a downward slanting surface which is slanted downward toward the second area so that the elastic moving pin moves into the second area.

A groove depth of the first guide groove may be deeper than a groove depth of the at least one second guide groove.

The groove depth of the first guide groove may be deeper than a groove depth of the second end of the second guide groove.

The first guide groove may include: a reference position; a wide-angle position which is connected to the reference position and is positioned in front of the reference position in the optical axis direction; and a telephoto position which is connected to the wide-angle position and is positioned in front of the wide-angle position in the optical axis direction.

The at least one second guide groove may include a wide-angle guide groove including a first end separated from the wide-angle position of the first guide groove and the a second end connected to the reference position of the first guide groove, and a telephoto guide groove including a first end separated from the telephoto position of the first guide groove and a second end connected to the first guide groove between the wide-angle position and the telephoto position.

The first guide groove may further include a downward slanting portion and an upward slanting portion formed between the wide-angle position and the telephoto position. The downward slanting portion may be connected to the wide-angle position and slanted downward in the circumferential direction, and the upward slanting portion may be connected to the telephoto position and slanted upward in the circumferential direction.

The second end of the telephoto guide groove may be connected to the upward slanting portion.

When the at least one elastic moving pin is positioned in the reference position of the first guide groove, the first and second barrels may overlap each other.

The first barrel may be a lens barrel which supports a first lens group exposed to the outside. The second barrel may be a cam barrel which is disposed inside the lens barrel.

The lens barrel assembly may further include a third barrel which is disposed inside the second barrel and supports a second lens group.

The third barrel may include a second elastic moving pin which protrudes outwardly and elastically deforms. The second barrel may include a third guide groove into which the second elastic moving pin is inserted and which obliquely extends in the circumferential direction to guide a movement of the third barrel, and a fourth guide groove including a first end separated from the third guide groove and a second end connected to the third guide groove to guide the second elastic moving pin so that the second elastic moving pin returns into the third guide groove when the second elastic moving pin is separated from the third guide groove.

The first barrel may include a protrusion which protrudes outwardly. The lens barrel assembly may further include an external barrel, which is disposed in an outer side of the first barrel and includes a straight groove that is extended in parallel with the optical axis and into which the protrusion is inserted.

According to another embodiment, a photographing apparatus includes: a lens barrel assembly including a first barrel and a second barrel which rotates in an optical axis direction and supports the first barrel so that the first barrel moves relative to the optical axis direction, and an image pickup device which receives light having passed the lens barrel assembly to generate an electrical signal.

BRIEF DESCRIPTION OF THE DRAWINGS

The above and other features and advantages will become more apparent by describing in detail exemplary embodiments thereof with reference to the attached drawings in which.

DETAILED DESCRIPTION

Structures and operations of a lens barrel assembly and a photographing apparatus having the lens barrel assembly, according to exemplary embodiments, will now be described in detail with reference to the attached drawings.

Figure 1:
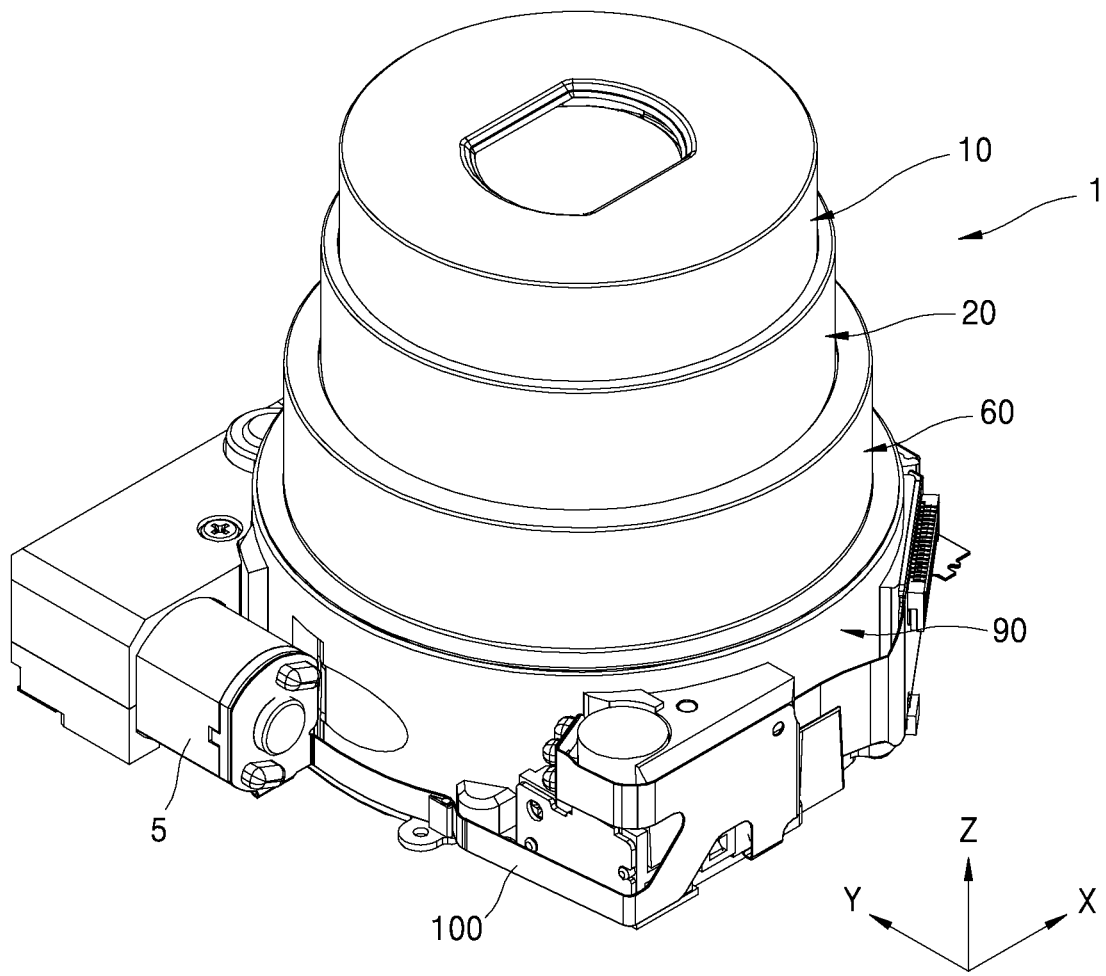
FIG. 1 is a perspective view illustrating a lens barrel assembly and a photographing apparatus having the lens barrel assembly, according to an exemplary embodiment.
Figure 2:
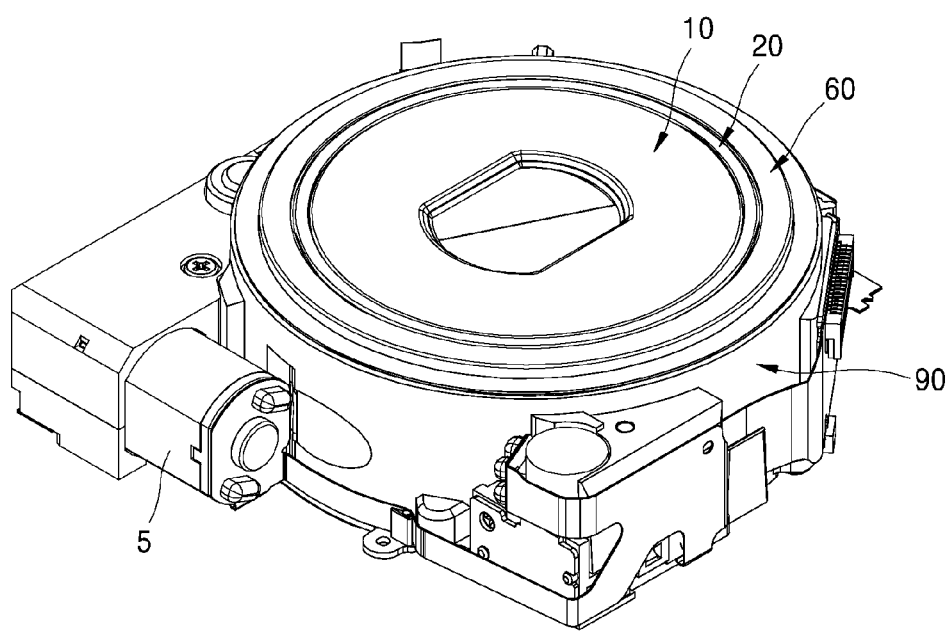
FIG. 2 is a perspective view illustrating the lens barrel assembly of FIG. 1 that is housed in the photographing apparatus.

FIG. 1 is a perspective view illustrating a lens barrel assembly 1 and a photographing apparatus having the lens barrel assembly 1, according to an exemplary embodiment. FIG. 2 is a perspective view illustrating the lens barrel assembly 1 of FIG. 1 that is housed in the photographing apparatus.

Figure 3:
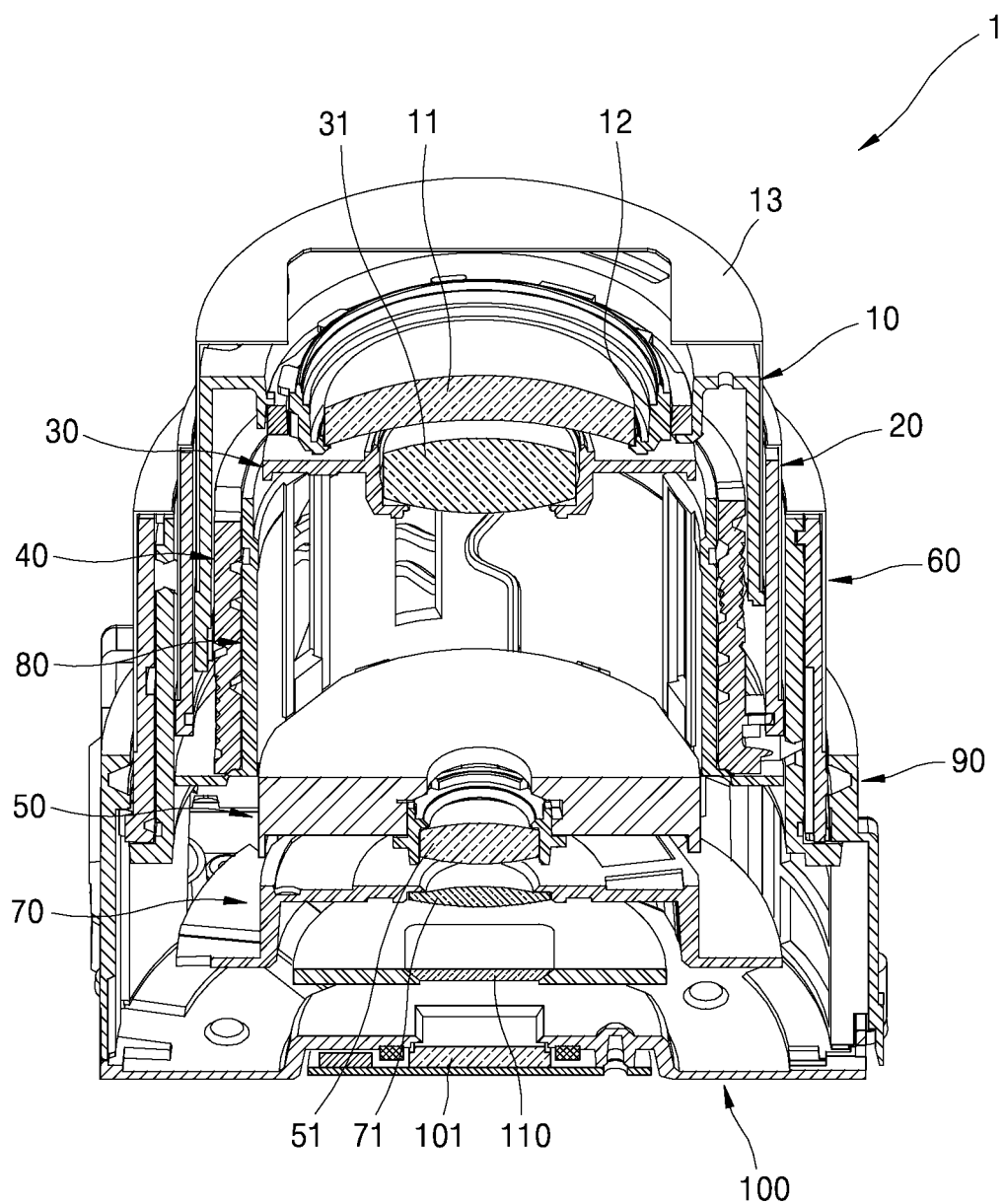
FIG. 3 is a perspective view illustrating elements of the lens barrel assembly and the photographing apparatus of FIG. 1.

The photographing apparatus of FIG. 1 includes the lens barrel assembly 1 and an image pickup device 101 of FIG. 3. When the photographing apparatus is not being operated, the lens barrel assembly 1 is housed in the photographing apparatus as shown in FIG. 2. When the photographing apparatus is being operated, the lens barrel assembly 1 protrudes from the photographing apparatus in a direction of an optical axis (Z axis) as shown in FIG. 1.

When the lens barrel assembly 1 extends by protruding from the photographing apparatus, optical lenses (not shown) of the lens barrel assembly 1 move along the optical axis. Therefore, the lens barrel assembly 1 performs a zooming operation for adjusting a magnification of a subject image or a focusing operation for adjusting a focal point of a subject.

In the present exemplary embodiment, the lens barrel assembly 1 operates to extend in three stages in order to perform an optical zooming function. The lens barrel assembly 1 includes an outer cylinder 90 installed on a base 100, a second cylinder 60 disposed on the outer cylinder 90 to be movable, a first cylinder 20, and a first lens barrel 10. The second cylinder 60 is disposed to move forward or backward along the optical axis (Z axis direction) from the outer cylinder 90, and the first cylinder 20 is disposed to move forward or backward along the optical axis from the second cylinder 60. The first lens barrel 10 is disposed to move forward or backward along the optical axis from the first cylinder 20. In the lens barrel assembly 1 having the above-described structure, the first lens barrel 10 and the first and second cylinders 20 and 60, which may move along the optical axis from the outer cylinder 90 fixed onto the base 100, extend in three stages to perform a zooming function. However, the structure of the lens barrel assembly 1 is not limited to a three-stage structure, and the lens barrel assembly 1 may operate to extend in two or four stages in order to perform the zooming function.

On outer sides of the base 100 and the outer cylinder 90, there may be disposed a driving unit 5 that generates a driving power for performing the zooming function.

The photographing apparatus including the lens barrel assembly 1 having the above-described structure may include a digital still camera which captures a still image, a digital camcorder which captures a moving image, a camera module which is installed in a portable mobile device, or the like.

According to the exemplary embodiment described with reference to FIGS. 1 and 2, the lens barrel assembly 1 is manufactured as a fixed type lens barrel, which is fixedly installed in the photographing apparatus, but it is not limited thereto. Therefore, the lens barrel assembly 1 may be manufactured as an exchangeable type lens barrel, which is detachably installed in the photographing apparatus.

Figure 4:
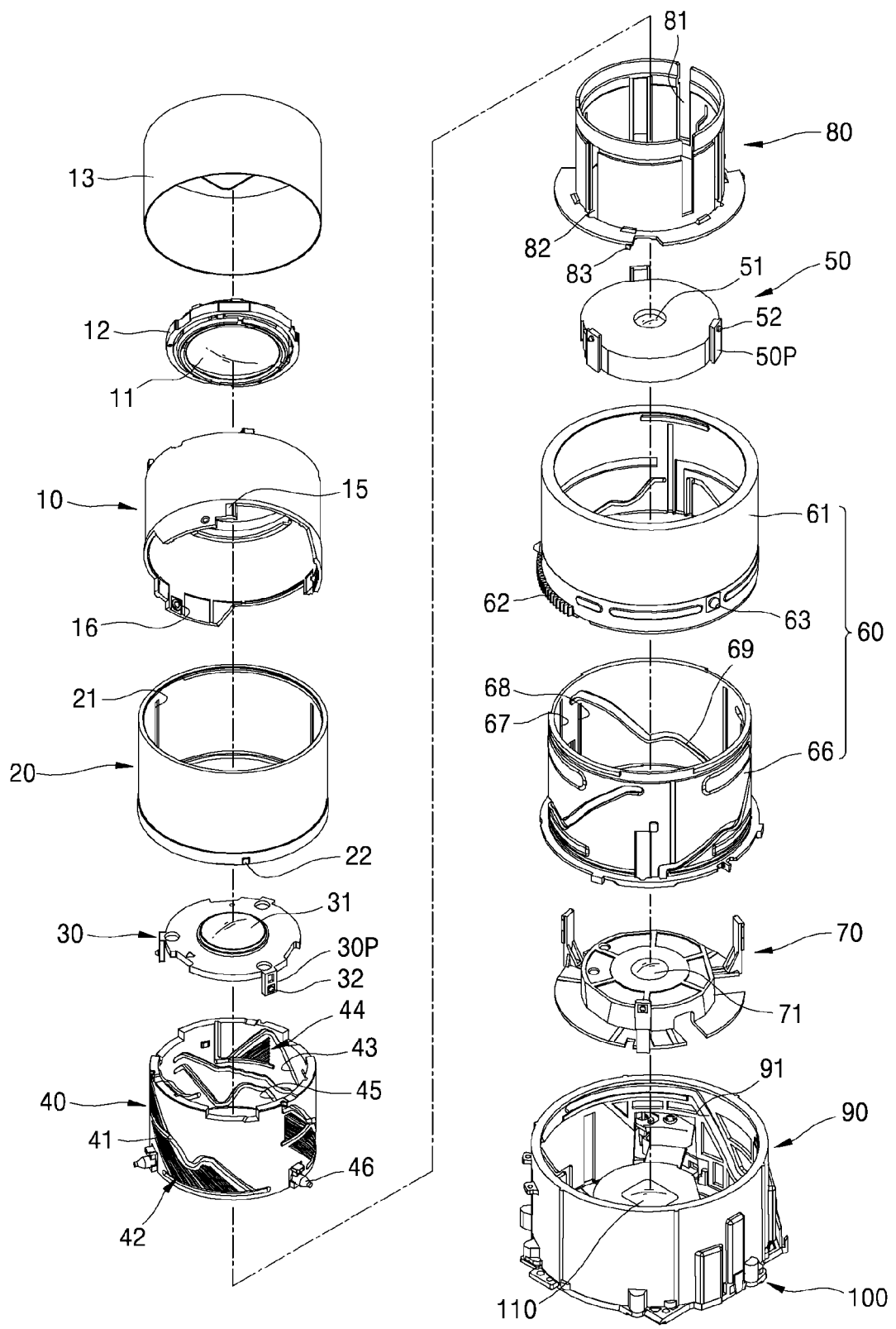
FIG. 4 is an exploded perspective view illustrating elements of the lens barrel assembly of FIG. 1.

FIG. 3 is a perspective view illustrating elements of the lens barrel assembly 1 of FIG. 1 and the photographing apparatus of FIG. 1 having the lens barrel assembly 1. FIG. 4 is an exploded perspective view illustrating elements of the lens barrel assembly 1 of FIG. 1. For convenience, the lens barrel assembly 1 of FIG. 1 is at a wide-angle position in FIG. 3.

Referring to FIGS. 3 and 4, the lens barrel assembly 1 includes the first lens barrel 10 which supports a first lens group 11, the first cylinder 20 which is disposed on an outer side of the first lens barrel 10, a cam barrel 40 which is disposed on an inner side of the first lens barrel 10, the second cylinder 60 which is disposed on an outer side of the first cylinder 20 and moveably supports the first cylinder 20 and the cam barrel 40, and the outer cylinder 90 which is disposed on an outer side of the second cylinder 60. The outer cylinder 90 operates as a support structure which keeps the barrels and cylinders in a fixed state thereof in the lens barrel assembly 1. A second lens barrel 30, which supports a second lens group 31, and a third lens barrel 50, which supports a third lens group 51, are disposed on an inner side of the cam barrel 40. A fourth lens barrel 70, which supports a fourth lens group 71, is disposed on an inner side of the second cylinder 60.

When the lens barrel assembly 1 operates to perform the zooming function, the first lens barrel 10 protrudes toward the front of the optical axis direction (Z axis direction). The first lens barrel 10 is formed in a hollow cylindrical shape to support the first lens group 11. The first lens barrel 10 has first protrusions 15, which protrude from an outer side of the first lens barrel 10 to the outside, and first elastic moving pins 16, which protrude from an inner side of the first lens barrel 10 to the inside and elastically deform. A lens support part 12 is interposed between the first lens group 11 and the first lens barrel 10 to be combined with a front part of the first lens barrel 10. A protecting case 13 is combined with the first lens barrel 10 to protect the first lens group 11. The first lens barrel 10 moves forward or backward along the optical axis direction to adjust a position of the first lens group 11 in the optical axis direction.

The first cylinder 20 is formed in a hollow cylindrical shape and is disposed on an outer side of the first lens barrel 10. The first cylinder 20 includes first straight guide grooves 21, which are formed in the inner side of the first cylinder 20 to extend in parallel with the optical axis. The first protrusions 15 are inserted into the first straight guide grooves 21 so that positions thereof in a circumferential direction are fixed. Second protrusions 22 are formed on the outer side of the first cylinder 20.

The second cylinder 60 is disposed on the outer side of the first cylinder 20. The second cylinder 60 is formed in a hollow cylindrical shape and is divided into a first sub-cylinder 61 and a second sub-cylinder 66.

A gear 62 is formed on an outer side of the first sub-cylinder 61 to extend in a circumferential direction thereof. Since the driving unit 5 of FIG. 1 is engaged with the gear 62, the driving power generated by the driving unit 5 is transmitted to the gear 62 to rotate the first sub-cylinder 61 with respect to the outer cylinder 90. Third protrusions 63 are formed on the outer side of the first sub-cylinder 61 to protrude to the outside.

The second sub-cylinder 66 is disposed on an inner side of the first sub-cylinder 61 and includes second and third straight guide grooves 67 and 68. The second protrusions 22 are inserted into the second straight guide grooves 67 so that positions thereof in the circumferential direction of the first cylinder 20 are fixed. Sixth protrusions 83 of a straight guide member 80 are inserted into the third straight guide grooves 68. A first guide portion 69 is formed on the second sub-cylinder 66 to extend obliquely in the circumferential direction.

The outer cylinder 90 is disposed on the outer side of the second cylinder 60, and the base 100 is combined with an end of the outer cylinder 90. The image pickup device 101 is disposed on the base 100 and converts image light having passed the first, second, third, and fourth lens groups 11, 31, 51, and 71 into an electrical signal. The image pickup device 101 is disposed at a position corresponding to the first, second, third, and fourth lens groups 11, 31, 51, and 71. The image pickup device 101 may be a photoelectric conversion device such as a charge-coupled device (CCD) or a complementary metal oxide semiconductor (CMOS) image sensor. A second guide portion 91 is formed on the inner side of the outer cylinder 90. The third protrusions 63 are inserted into the second guide portion 91, and the first sub-cylinder 61 is guided to move in the optical axis direction. An imaging lens 110 is disposed between the image pickup device 101 and the fourth lens group 71. The imaging lens 110 may move along the optical axis direction to perform a focusing function.

The cam barrel 40 is formed in a hollow cylindrical shape and is disposed on the inner side of the first lens barrel 10. A first guide groove 41 is formed in an outer side of the cam barrel 40 and extends in the circumferential direction to slant in the optical axis direction so that the first elastic moving pins 16 are inserted into the first guide groove 41. The first guide groove 41 guides movements of the first elastic moving pins 16 so that the first lens barrel 10 performs a straight movement in the optical axis. Fourth protrusions 46 are formed on the outer side of the cam barrel 40. The fourth protrusions 46 are connected to the first sub-cylinder 61 through the first guide portion 69. The cam barrel 40 rotates together with the first sub-cylinder 61 through the fourth protrusions 46.

The second and third lens barrels 30 and 50 are moveably disposed inside the cam barrel 40. The second lens barrel 30 supports the second lens group 31, and the third lens barrel 50 supports the third lens group 51. Third guide grooves 43 are formed in the inner side of the cam barrel 40 to guide a movement of the second lens barrel 30. Fifth guide grooves 45 are formed in the inner side of the cam barrel 40 to guide of a movement of the third lens barrel 50. Second elastic moving pins 32 protrude from the outer side of the second lens barrel 30 and elastically deform. The second elastic moving pins 32 are inserted into the third guide grooves 43 to guide a movement of the second lens barrel 30 in the optical axis direction. Fifth protrusions 52 are formed on the outer side of the third lens barrel 50 to protrude to the outside. The fifth protrusions 52 are inserted into the fifth guide grooves 45 to guide a movement of the third lens barrel 50 in the optical axis direction.

The second and third lens barrels 30 and 50 perform straight movements in the optical axis direction through the cam barrel 40. Protrusion areas 30P and 50P are respectively formed on the outer sides of the second and third lens barrels 30 and 50 so that the second and third lens barrel 30 and 50 perform straight movements in the optical axis direction without rotating. A straight guide member 80 is disposed between the second and third lens barrels 30 and 50 and the cam barrel 40 to guide a movement of the second lens barrel 30 in the optical axis direction.

The straight guide member 80 includes first and second notched portions 81 and 82, which are formed in parallel with the optical axis. The first notched portions 81 are formed by cutting from the front of the photographing apparatus in the optical axis direction, and the second notched portions 82 are formed by cutting from the back of the photographing apparatus in the optical axis direction. The protrusion areas 30P and 50P of the second and third lens barrels 30 and 50 are guided by the first and second notched portions 81 and 82 extending in parallel with the optical axis. Therefore, the second and third lens barrels 30 and 50 perform straight movements in the optical axis direction without rotating. The straight guide member 80 includes the sixth protrusions 83. The sixth protrusions 83 are combined with the third straight guide grooves 68, which are formed in the second sub-cylinder 66, to extend in parallel with the optical axis. The straight guide member 80 is combined with the third straight guide grooves 68 so that a position thereof is fixed in the circumferential direction. The second and third lens barrels 30 and 50 are combined with the first and second notched portions 81 and 82 of the straight guide member 80, and thus their positions are fixed in the circumferential direction, like the straight guide member 80.

Figure 5:
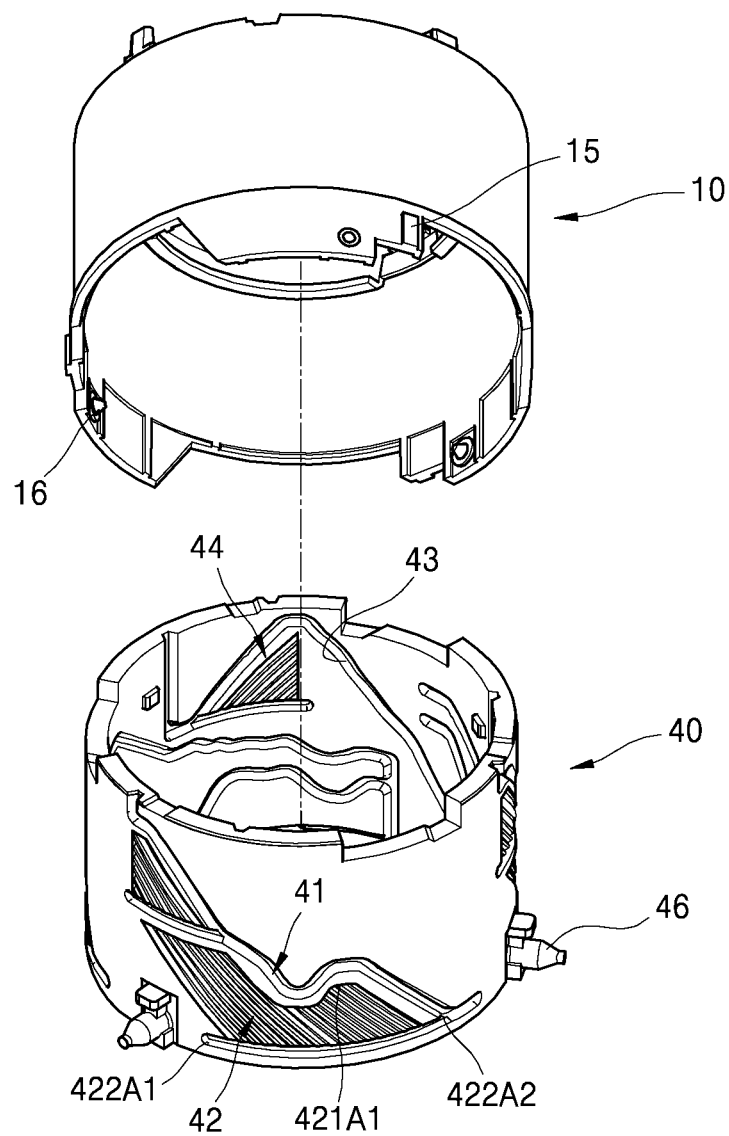
FIG. 5 is a perspective view illustrating a lens barrel and a cam barrel of FIG. 4.

FIG. 5 is a perspective view illustrating the first lens barrel 10 and the cam barrel 40 of FIG. 4.

Referring to FIG. 5, the first lens barrel 10 includes the first elastic moving pins 16, which protrude toward the cam barrel 40 and elastically deform. The cam barrel 40 includes first and second guide grooves 41 and 42 into which the first elastic moving pins 16 may be inserted. The first guide groove 41 is obliquely formed in the circumferential direction. An end 422A1 of the second guide groove 42 is separated from the first guide groove 41, and the other end 422A2 is combined with the first guide groove 41.

The first elastic moving pins 16 protrudes from the inner side of the first lens barrel 10 and elastically deform. When the first elastic moving pins 16 are inserted into the first guide groove 41, the first elastic moving pins 16 are kept inserted in the first guide groove 41 or are separated from the first guide groove 41 to be inserted into the second guide groove 42 according to a magnitude of an external force F (FIG. 8) applied to the first lens barrel 10. For example, when external shock (or force) is not applied to the first lens barrel 10 or an external force F having less than a predetermined magnitude is applied to the first lens barrel 10, the first elastic moving pins 16 are kept inserted in the first guide groove 41. However, when an external force F having a predetermined magnitude or more is applied to the first lens barrel 10, the first elastic moving pins 16 are separated from (or leave) the first guide groove 41 to be inserted into the second guide grooves 42. The external force F having the predetermined magnitude may be, for example, an external force which is applied to the first lens barrel 10 when a 0.5 Kg iron bead free falls at a height between 15 cm and 20 cm from the first lens barrel 10.

Since the first elastic moving pins 16 elastically deform, when the external force F having the predetermined magnitude or more is applied, the first elastic moving pins 16 absorb external shock in the process of being separated from the first guide groove 41 and inserted into the second guide grooves 42. Also, the first elastic moving pins 16 are prevented from being damaged by the external shock. Also, since the first elastic moving pins 16 elastically deform, the first elastic moving pins 16 prevent the first lens barrel 10 from being forcibly put into the cam barrel 40. Although groove depths of the first and second guide grooves 41 and 42 vary, the first elastic moving pins 16 may be stably combined with the first or second guide grooves 41 or 42.

Figure 6:
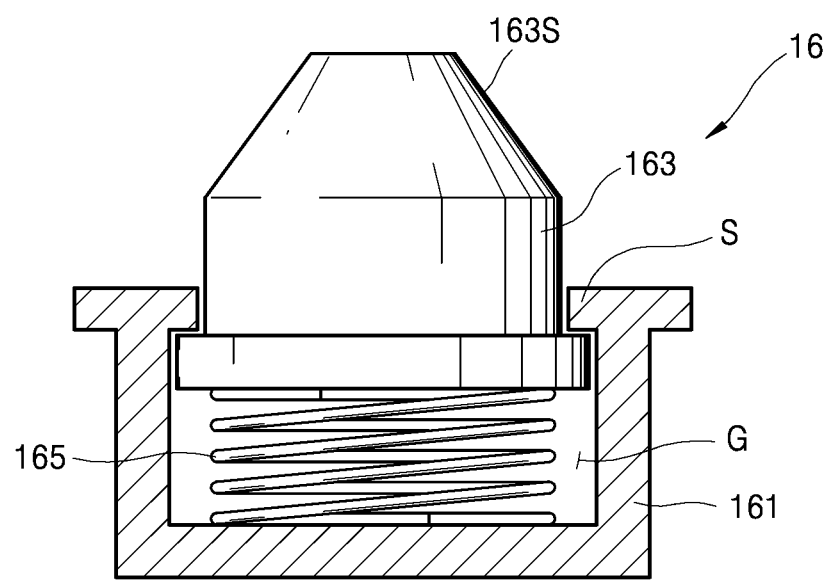
FIG. 6 is a cross-sectional view illustrating an elastic moving pin of the lens barrel of FIG. 4.

The first elastic moving pins 16 may include various structures which elastically deform. For example, as shown in FIG. 6, the first elastic moving pin 16 includes a body portion 161, a protrusion 163, and an elastic portion 165. The body portion 161 is fixedly installed in the first lens barrel 10 and includes a housing groove G. The protrusion 163 is inserted into the housing groove G so that portion thereof protrudes outside the body portion 161. A protruding portion of the protrusion 163 includes a slanting surface 163S to prevent damage from occurring when the protrusion 163 is separated from the first guide groove 41. The elastic portion 165 is disposed between the body portion 161 and the protrusion 163 to provide an elastic force to the protrusion 163. The elastic portion 165 may be a spring, which provides an elastic force through a structural characteristic thereof, or an elastic member which provides an elastic force through a material characteristic thereof. A protruding height of the protrusion 163 is limited by a stopper S formed at the body portion 161.

Figure 7A:
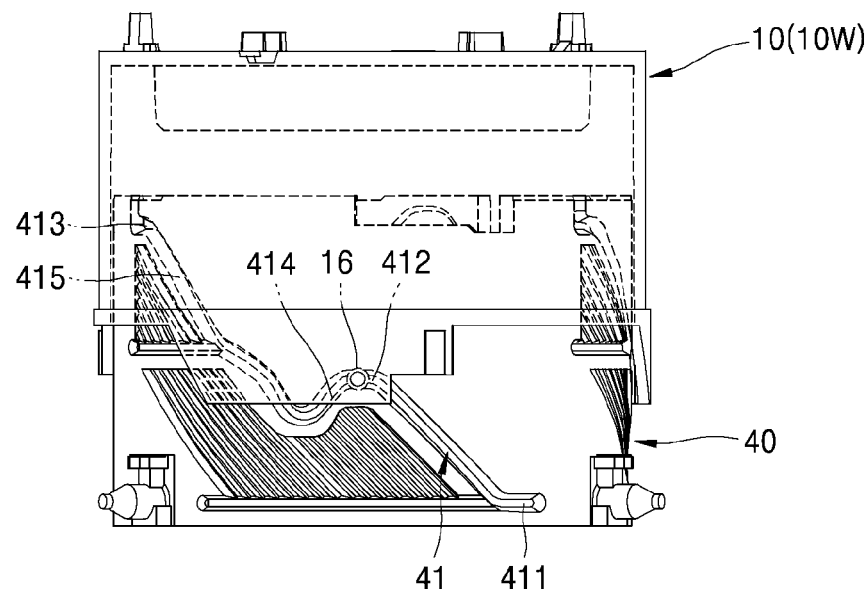
FIGS. 7A and 7B are side views illustrating normal operation states of the lens barrel and the cam barrel of FIG. 5.
Figure 7B:
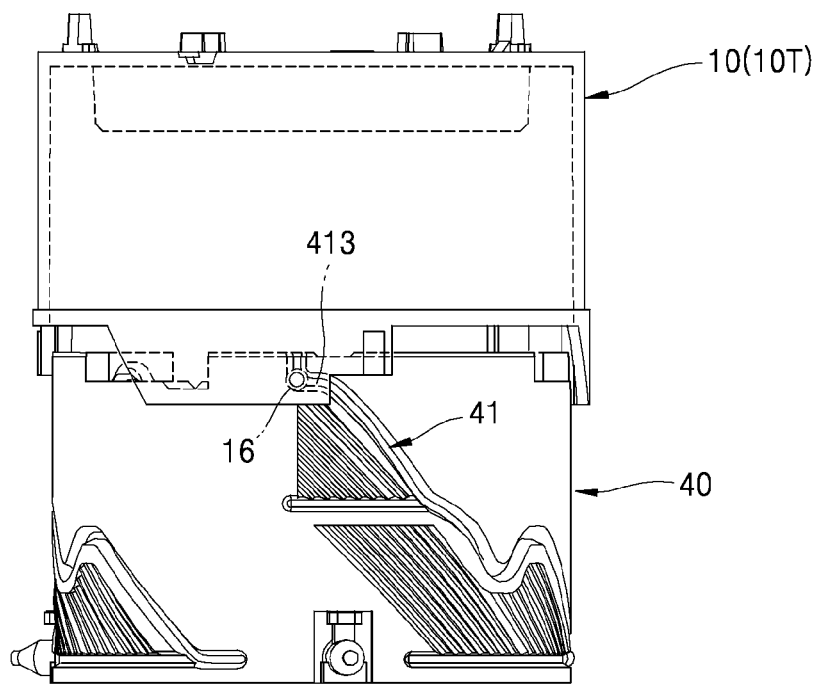

FIGS. 7A and 7B are side views illustrating normal operation states of the first lens barrel 10 and the cam barrel 40 of FIG. 5. Referring to FIGS. 7A and 7B, the first elastic moving pin 16 is inserted into the first guide groove 41 to move along the first guide groove 41 according to a rotation of the cam barrel 40. The first lens barrel 10 moves forward or backward in the optical axis direction according to the movements of the first elastic moving pin 16.

The first guide groove 41 includes a reference position 411, a wide-angle position 412, and a telephoto position 413. The reference position 411 refers to a position in which the first elastic moving pin 16 is combined with the first guide groove 41 before the lens barrel assembly 1 operates or when the lens barrel assembly 1 ends the operation thereof. When the first elastic moving pin 16 is positioned in the reference position 411, the first lens barrel 10 and the cam barrel 40 overlap each other. The wide-angle position 412 refers to a position in which the first elastic moving pin 16 is combined with the first guide groove 41 when the first lens barrel 10 is positioned at a wide-angle end 10W. The telephoto position 413 refers to a position in which the first elastic moving pin 16 is combined with the first guide groove 41 when the first lens barrel 10 is positioned at a telephoto end 10T. According to the rotation of the cam barrel 40, the first elastic moving pin 16 is positioned in the reference position 411, in the wide-angle position 412 as shown in FIG. 7A, or in the telephoto position 413 as shown in FIG. 7B. A downward slanting portion 414 is connected to the wide-angle position 412 between the wide-angle position 412 and the telephoto position 413 and is slanted downward in the circumferential direction. An upward slanting portion 415 is connected to the downward slanting portion 414 and the telephoto position 413 and is slanted upward in the circumferential direction.

Figure 8:
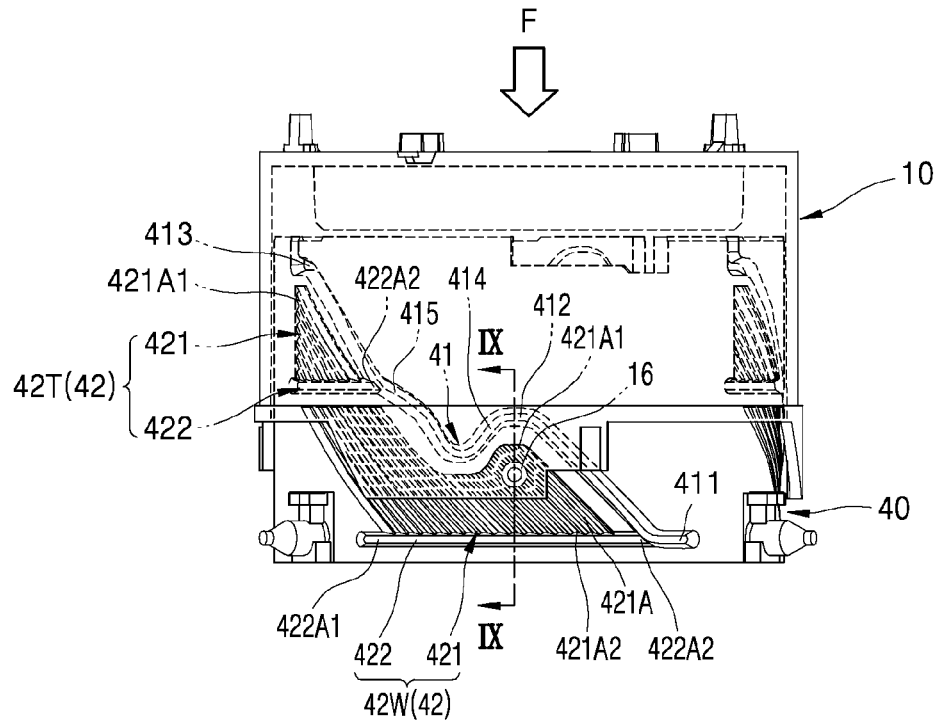
FIG. 8 is a side view illustrating states of the lens barrel and the cam barrel when an external force having a predetermined magnitude is applied to the lens barrel of FIG. 7A.

FIG. 8 is a side view illustrating states of the first lens barrel 10 and the cam barrel 40 when an external force having a predetermined magnitude or more is applied to the first lens barrel 10 of FIG. 7A.

Referring to FIG. 8, when an external force F having a predetermined magnitude or more is applied to the first lens barrel 10, the first elastic moving pin 16 is separated from the first guide groove 41 and then moved in a direction in which the external force F is applied. The first elastic moving pin 16, which has been separated from the first guide groove 41, is inserted into the second guide grooves 42.

The second guide groove 42 restricts the movements of the first elastic moving pin 16 moved by the external force F and leads the first elastic moving pin 16 inserted into the second guide groove 42 to return into the first guide groove 41. The second guide groove 42 includes a first area 421 into which the first elastic moving pin 16 separated from the first guide groove 41 is inserted and a second area 422 which guides the first elastic moving pin 16 inserted into the first area 421 to the first guide groove 41.

An end 421A1 of the first area 421 is separated from the first guide groove 41, and the other end 421A2 is connected to the second area 422. The other end 422A2 of the second area 422 is connected to the first guide groove 41.

Figure 9:
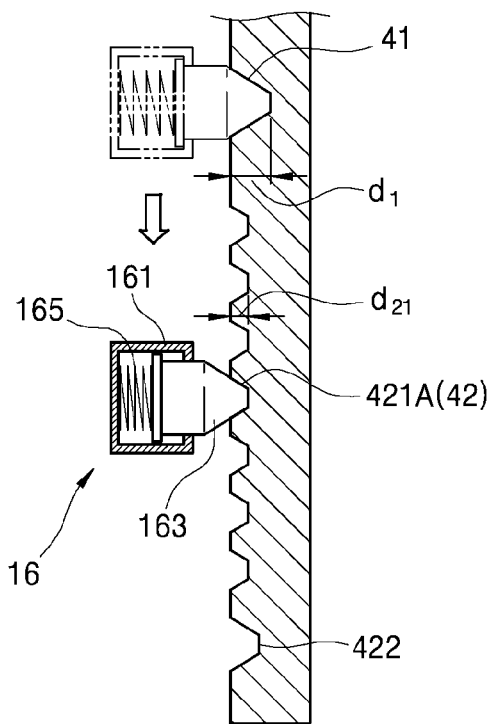
FIG. 9 is a cross-sectional view illustrating the lens barrel and the cam barrel taken along line IX-IX of FIG. 8.

The first area 421 includes a plurality of sub guide grooves 421A which extend in a direction intersecting with the optical axis direction. Since the plurality of sub guide grooves 421A are formed in the direction intersecting with the optical axis direction, the plurality of sub guide grooves 421A restrict the movement of the first elastic moving pins 16 by the external force F. FIG. 9 is a cross-sectional view illustrating the first lens barrel 10 and the cam barrel 40 taken along line IX-IX of FIG. 8. Referring to FIG. 9, when the first elastic moving pin 16 separated from the first guide groove 41 by the external force F is inserted into or separated from the plurality of sub guide grooves 421A, shock may be absorbed. Therefore, when the first elastic moving pin 16 is inserted into one of the plurality of sub guide grooves 421A, the first elastic moving pin 16 may stop its movements. Groove depths $d_{21}$ of the plurality of sub guide grooves 421A are shallower than a groove depth $d_1$ of the first guide groove 41.

Referring to FIG. 8 again, the ends 421A1 of the plurality of sub guide grooves 421A are separated from the first guide groove 41, and the other ends 421A2 of the plurality of sub guide grooves 421A are connected to the second area 422. The second area 422 extends substantially in parallel with the circumferential direction.

Figure 10A:
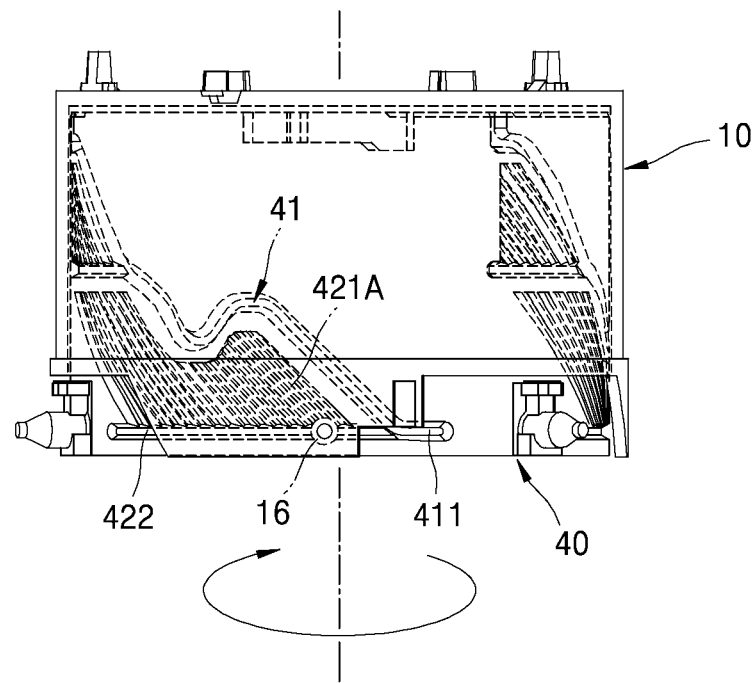
FIGS. 10A and 10B are side views illustrating states of the elastic moving pin of FIG. 8 that return into a first guide groove.
Figure 10B:
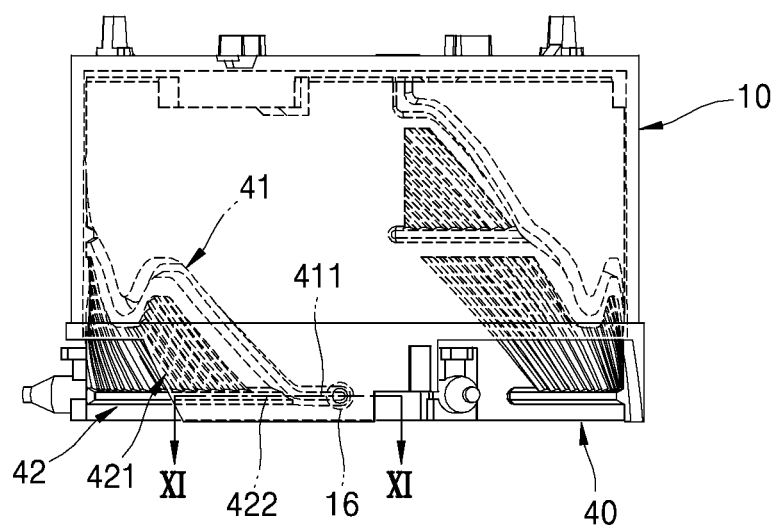

FIGS. 10A and 10B are side views illustrating states of the first elastic moving pin 16 of FIG. 8 that returns into the first guide groove 41. Referring to FIGS. 10A and 10B, if the cam barrel 40 rotates when the first elastic moving pin 16 is inserted into the sub guide grooves 421A, the first elastic moving pin 16 moves along the sub guide grooves 421A. The first elastic moving pin 16, which moved along the sub guide grooves 421A, moves into the second area 422 connected to the sub guide grooves 421A, as shown in FIG. 10A. When the cam barrel 40 of FIG. 10A additionally rotates in a direction indicated by an arrow, the first elastic moving pin 16 moves into the reference position 411, as shown in FIG. 10B. As described above, although the first elastic moving pins 16 are separated from the first guide groove 41 by the external force F having the predetermined magnitude or more, the first elastic moving pin 16 may return into the first guide groove 41 only through an ending operation that is one of the necessary control aspects of the photographing apparatus, without performing a complicated repair process such as a process of separating the lens barrel assembly 1. The photographing apparatus houses the lens barrel assembly 1 as shown in FIG. 2 through the ending operation. Here, the cam barrel 40 rotates to position the first elastic moving pin 16 in the reference position 411. When the first elastic moving pin 16 returns into the first guide groove 41, a normal operation may be resumed.

Figure 11:
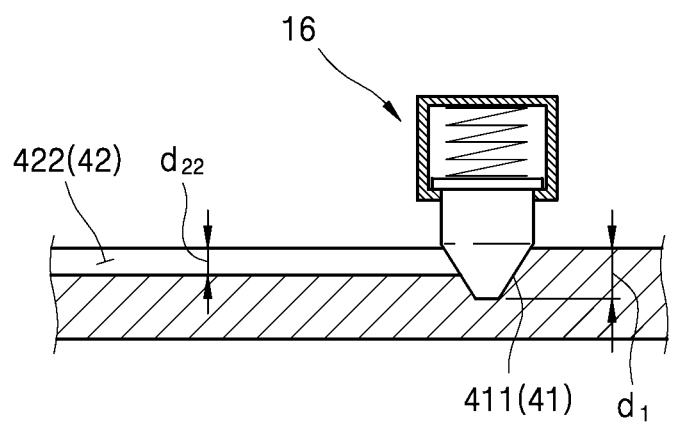
FIG. 11 is a cross-sectional view of first and second guide grooves taken along line XI-XI of FIG. 10B.

The first guide groove 41 may have a deeper groove depth than the second guide groove 42. For example, the first guide groove 41 may have a deeper groove depth than the end 422A2 of the second guide groove 42, i.e., an area connected to the first guide groove 41. FIG. 11 is a cross-sectional view of the first guide groove 41 and the second guide groove 42 taken along line XI-XI of FIG. 10B. Referring to FIG. 11, since the second guide groove 42 has a shallower depth than the first guide groove 41 ($d_{22}<d_1$), the first elastic moving pin 16 freely moves from the second guide groove 42 to the first guide groove 41. However, movement of the first elastic moving pin 16 from the first guide groove 41 to the second guide groove 42 is restricted. Therefore, the second guide groove 42 easily returns the first elastic moving pin 16 separated from the first guide groove 41 into the first guide groove 41 without affecting normal operations of the first elastic moving pins 16.

Referring to FIG. 8 again, a plurality of second guide grooves 42 may be formed. For example, the second guide groove 42 may include a wide-angle guide groove 42W and a telephoto guide groove 42T. The wide-angle guide groove 42W and the telephoto guide groove 42T respectively include the first and second areas 421 and 422 described above. The end 422A1 of the wide-angle guide groove 42W is separated from the wide-angle position 412, and the other end 422A2 of the wide guide groove 42W is connected to the reference position 411. The end 421A1 of the telephoto guide groove 42T is separated from the telephoto position 413, and the other end 422A2 of the telephoto guide groove 42T is connected to the upward slanting portion 415 disposed between the wide-angle position 412 and the telephoto position 413. The wide-angle guide groove 42W guides the first elastic moving pin 16 to the reference position 411, and the telephoto guide groove 42T guides the first elastic moving pin 16 to the upward slanting portion 415. The telephoto guide groove 42T guides the first elastic moving pin 16 separated from the first guide groove 41 to the upward slanting portion 415 to return the first elastic moving pin 16 to the reference position 411 through the downward slanting portion 414 of the first guide groove 41. Therefore, the first lens barrel 10 temporarily ascends in a descending process. This prevents a clash of the first lens barrel 10 with the second lens barrel 30 if the first lens barrel 10 continuously ascends. The prevention of the clash may be further effective if the second lens barrel 30 temporarily ascends when the second lens barrel 30 ends an operation thereof.

Figure 12:
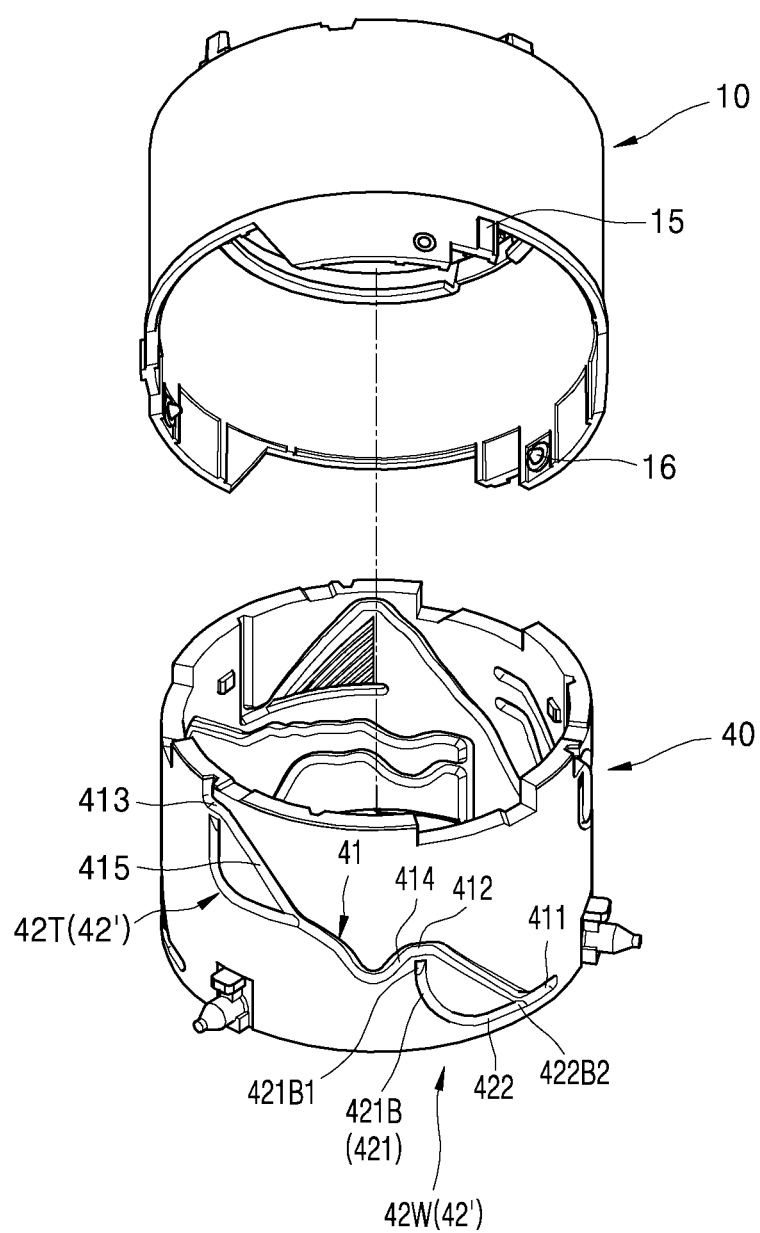
FIG. 12 is a perspective view illustrating a second guide groove of the cam barrel of FIG. 5, according to another exemplary embodiment.
Figure 13A:
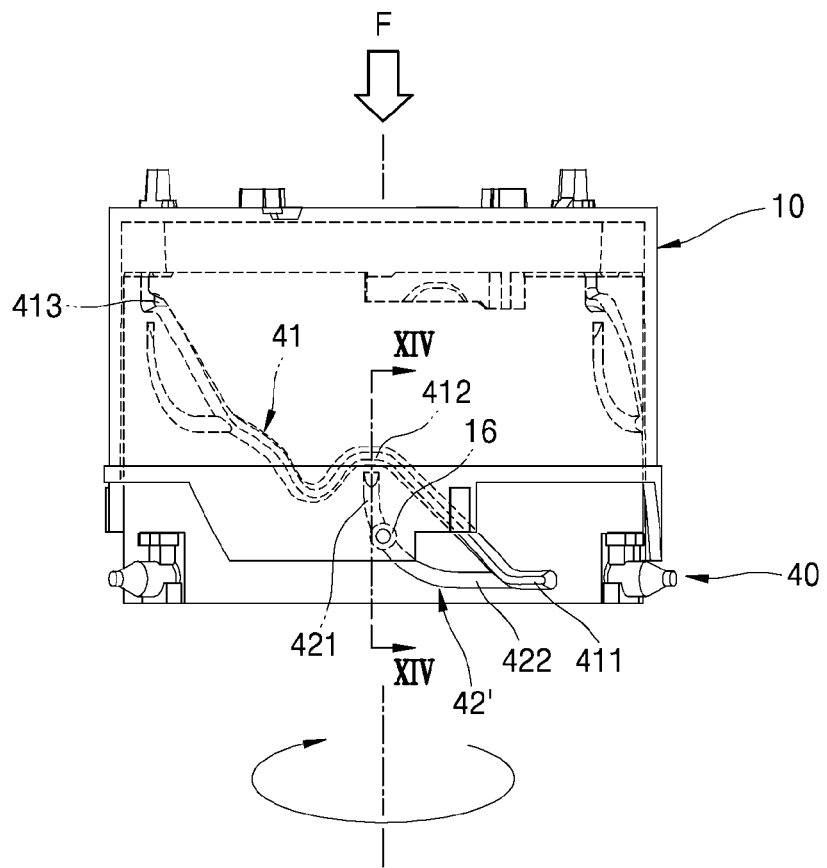
FIGS. 13A and 13B are side views illustrating operation states of the lens barrel and the cam barrel when external shock is applied to the lens barrel of FIG. 12.
Figure 13B:
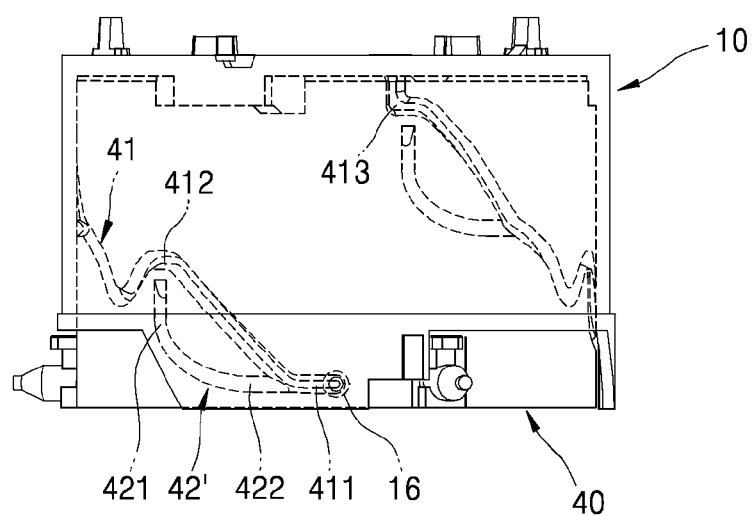

FIG. 12 is a perspective view illustrating a second guide groove 42' of the cam barrel 40 of FIG. 5, according to another exemplary embodiment. FIGS. 13A and 13B are side views illustrating operation states of the first lens barrel 10 and the cam barrel 40 when external force is applied to the first lens barrel 10 of FIG. 12. The same elements of FIG. 12 as those of FIG. 5 are denoted by the same reference numerals, and their repeated descriptions are omitted. Descriptions are focused on the second guide groove 42'.

The second guide groove 42' includes a first area 421 into which the first elastic moving pin 16 separated from the first guide groove 41 is inserted and a second area 422 which guides the first elastic moving pin 16 inserted into the first area 421 to the first guide groove 41.

An end 421B1 of the first area 421 is separated from the first guide groove 41, and an end 422B2 of the second area 422 is connected to the first guide groove 41.

The first area 421 includes a single sub guide groove 421B, which extends substantially in parallel with an optical axis.

When an external force F having a predetermined magnitude or more is applied to the first lens barrel 10, the sub guide groove 421B guides the first elastic moving pin 16 separated from the first guide groove 41 in a direction parallel with the optical axis. Since the sub guide groove 421B is a single groove but extends substantially in parallel with the optical axis direction in which the external force F is applied, the sub guide groove 421B prevents the first elastic moving pin 16 from being separated from the sub guide groove 421B.

Figure 14:
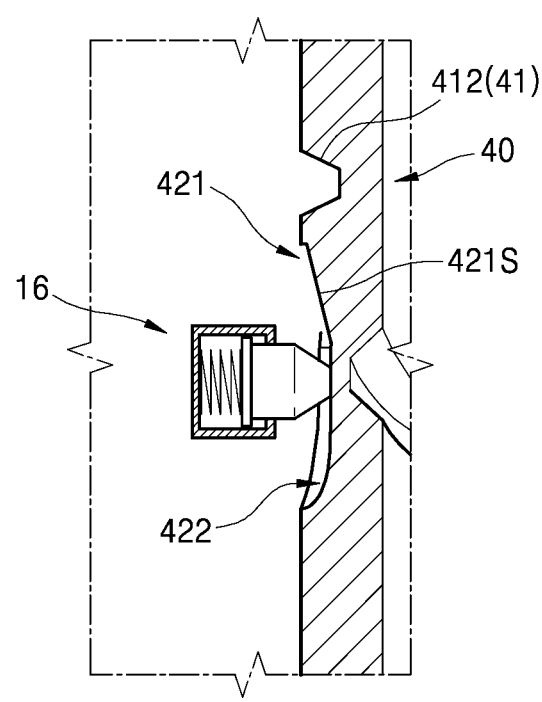
FIG. 14 is a cross-sectional view of a first guide groove taken along line XIV-XIV of FIG. 13A.

If the external force F having the predetermined magnitude is applied to the first lens barrel 10 when the first elastic moving pin 16 is positioned in the wide-angle position 412 of the first guide groove 41, the first elastic moving pin 16 is separated from the wide-angle position 412 of the first guide groove 41 and inserted into the first area 421 of the second guide groove 42', as shown in FIG. 13A. FIG. 14 is a cross-sectional view of the cam barrel 40 taken along line XIV-XIV of FIG. 13A. Referring to FIG. 14, the first area 421 includes a downward slanting surface 421S, which is slanted downward toward the second area 422. The first elastic moving pin 16 inserted into the first area 421 moves toward the second area 422 along the downward slanting surface 421S. Even if the magnitude of the external force F is small, the first elastic moving pin 16 moves to a predetermined position connected to the second area 422 through the downward slanting surface 421S. Therefore, although the first area 421 is formed in the optical axis direction perpendicular to a rotation direction of the cam barrel 40, the first area 421 does not affect a rotation of the cam barrel 40. If the cam barrel 40 of FIG. 13A additionally rotates in a direction denoted by an arrow, the first elastic moving pins 16 move to the reference position 411 of the first guide groove 41, as shown in FIG. 13B. Even in the present exemplary embodiment, a groove depth of the first guide groove 41 may be deeper than a groove depth of the second guide groove 42'.

Figure 15:
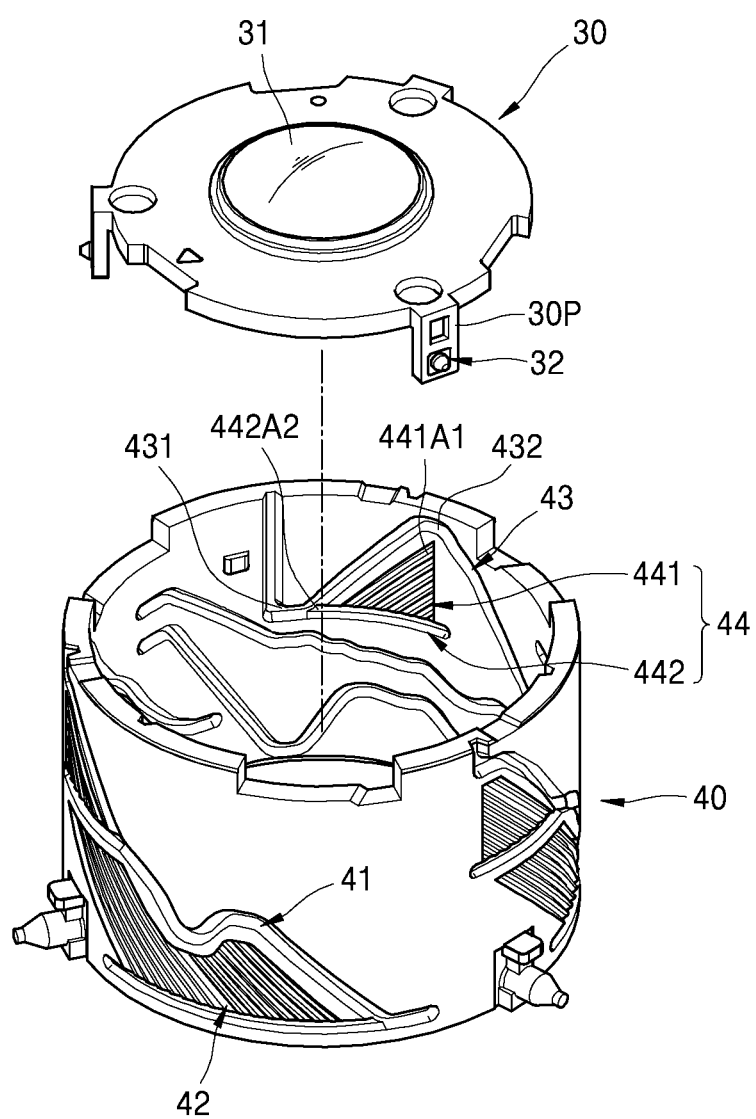
FIG. 15 is an enlarged perspective view illustrating a cam barrel and a second lens barrel of FIG. 4.
Figure 16:
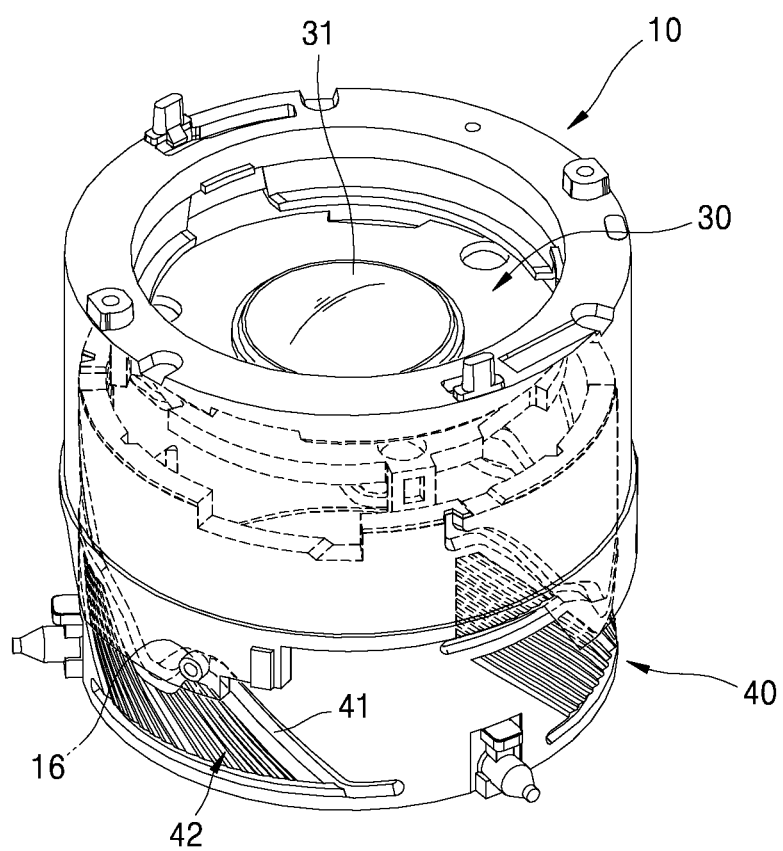
FIG. 16 is a perspective view illustrating operation states of a first lens barrel, the cam barrel, and the second lens barrel of FIG. 4.

FIG. 15 is an enlarged perspective view illustrating the cam barrel 40 and the second lens barrel 30 of FIG. 4. FIG. 16 is a perspective view illustrating operation states of the first lens barrel 10, the cam barrel 40, and the second lens barrel 30 of FIG. 4.

Referring to FIG. 15, the second lens barrel 30, which supports the second lens group 31, is disposed inside the cam barrel 40. Second elastic moving pins 32 are formed on the outer side of the second lens barrel 30, protrude to the outside, and elastically deform. The second elastic moving pins 32 may have various structures which elastically deform, e.g., may have the same structures as the first elastic moving pins 16 of FIG. 6. A third guide groove 43 and a fourth guide groove 44 are formed in the inner side of the cam barrel 40. The second elastic moving pins 32 are inserted into the third guide groove 43, and the third guide groove 43 extends obliquely in the circumferential direction. An end 441A1 of the fourth guide groove 44 is separated from the third guide groove 43, and the other end 442A2 of the fourth guide groove 44 is connected to the third guide groove 43.

When the second elastic moving pins 32 operate normally, the second elastic moving pins 32 move along the third guide groove 43, and thus the second lens barrel 30 moves in the optical axis direction. Thus, the second lens barrel 30 and the first lens barrel 10 may become close to or separated from each other.

The first lens barrel 10 and the second lens barrel 30 may be close to (or contact) each other through a rotation of the cam barrel 40, as shown in FIG. 16. Although not shown in the drawings, if the external force F having the predetermined magnitude or more is applied to the first lens barrel 10, the first elastic moving pins 16 are separated from the first guide groove 41, and the first lens barrel 10 goes back, i.e., descends, by a distance by which the first elastic moving pins 16 are separated and moved, in the optical axis direction. The second lens barrel 30, which contacts the first lens barrel 10, receives the external force F through the contact with the first lens barrel 10, and thus the second elastic moving pins 32 are separated from the third guide groove 43. The second elastic moving pins 32, which have been separated from the third guide groove 43, are inserted into the fourth guide groove 44. The fourth guide groove 44 guides the second elastic moving pins 32 to the third guide groove 43 when the cam barrel 40 rotates. The fourth guide groove 44 is separated from a wide-angle position 432 of the third guide groove 43 and is connected to a reference position 431. Therefore, if the second elastic moving pins 32 are separated from the third guide groove 43 in the wide-angle position 432, the second elastic moving pins 32 return into the third guide groove 43 through a rotation of the cam barrel 40. The fourth guide groove 44 is formed around the wide-angle position 432 of the third guide groove 43. When the first and second elastic moving pins 16 and 32 are respectively positioned in the wide-angle positions 412 and 432, the second lens barrel 30 and the first lens barrel 10 are closer to each other, as shown in FIG. 16. Therefore, in the state where the first and second elastic moving pins 16 and 32 are positioned in the wide-angle positions 412 and 432, when the external force F acts on the first lens barrel 10, the first and second elastic moving pins 16 and 32 may be separated from the wide-angle positions 412 and 432. Thus, by forming the fourth guide groove 44 around the wide-angle position 432, the second elastic moving pins 32 may be efficiently returned to the third guide groove 43.

As described above, the second elastic moving pins 32 and the fourth guide groove 44 are installed between the cam barrel 40 and the second lens barrel 30 to prevent an operation failure between the second lens barrel 30 and the cam barrel 40 due to external shock. As in the above-described exemplary embodiments, the fourth guide groove 44 includes first and second areas 441 and 442. The first and second areas 441 and 442 are the same as described in the above-described exemplary embodiments with respect to first and second areas 421 and 422, and thus their descriptions are omitted herein.

In the above-described exemplary embodiment, descriptions focused on the first lens barrel 10 and the cam barrel 40 disposed inside the first lens barrel 10 in consideration that external shock (an external force) is applied to the first lens barrel 10 that protrudes toward a front of the photographing apparatus. However, the invention is not limited thereto, and objects to be described may be changed. The cam barrel 40 rotates in the above-described exemplary embodiments but the invention is not limited thereto. In other words, the cam barrel 40 may rotate without a straight movement in an optical axis direction or may rotate simultaneously with a straight movement.

In a lens barrel assembly and a photographing apparatus having the lens barrel assembly according to the above-described exemplary embodiments, moving pins, which connect a lens barrel and a cam barrel to each other, elastically deform. Therefore, the moving pins are prevented from being damaged when external shock is applied and from being forcibly inserted. A first guide groove, which guides a focal length of the lens barrel, and a second guide groove separated from the first guide groove are formed. Therefore, the moving pins separated from the first guide groove return into the first guide groove through the second guide groove in a simple operation. As a result, the lens barrel assembly may quickly resume normal operation when the external shock is applied thereto.

While various embodiments of the invention have been particularly shown and described, it will be understood by those of ordinary skill in the art that various changes in form and details may be made therein without departing from the spirit and scope of the invention as defined by the following claims.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A lens barrel assembly comprising:
   a first barrel comprising at least one elastic moving pin, wherein the at least one elastic moving pin protrudes toward a second barrel and elastically deforms; and
   the second barrel comprises:
      a first guide groove into which the at least one elastic moving pin is inserted and which extends obliquely in a circumferential direction to guide a movement of the first barrel;
      at least one second guide groove comprising a first end separated from the first guide groove and a second end connected to the first guide groove to guide the at least one elastic moving pin so that the at least one elastic moving pin returns into the first guide groove when the at least one elastic moving pin is separated from the first guide groove,
   wherein the second barrel rotates in an optical axis direction and supports the first barrel so that the first barrel moves relative to the optical axis direction.

2. The lens barrel assembly of claim 1, wherein the at least one elastic moving pin comprises:
   a body portion which is installed in the first barrel to be fixed in the first barrel and comprises a housing groove;
   a protrusion which is inserted into the housing groove and comprises a portion protruding outside the body portion; and
   an elastic portion which is disposed between the body portion and the protrusion.

3. The lens barrel assembly of claim 1, wherein the at least one second guide groove comprises:
   a first area into which the at least one elastic moving pin separated from the first guide groove is inserted; and
   a second area which guides the at least one elastic moving pin inserted into the first area to the first guide groove.

4. The lens barrel assembly of claim 3, wherein an end of the first area is separated from the first guide groove, and an end of the second area is connected to the first guide groove.

5. The lens barrel assembly of claim 4, wherein the first area comprises a plurality of sub guide grooves which extend in a direction intersecting the optical axis direction.

6. The lens barrel assembly of claim 5, wherein first ends of the plurality of sub guide grooves are separated from the first guide groove, and second ends of the plurality of sub guide grooves are connected to the second area.

7. The lens barrel assembly of claim 6, wherein the second area extends in parallel with the circumferential direction.

8. The lens barrel assembly of claim 4, wherein the first area comprises a single sub guide groove which extends in parallel with an optical axis.

9. The lens barrel assembly of claim 8, wherein the sub guide groove comprises a downward slanting surface which is slanted downward toward the second area so that the at least one elastic moving pin moves into the second area.

10. The lens barrel assembly of claim 1, wherein a groove depth of the first guide groove is deeper than a groove depth of the at least one second guide groove.

11. The lens barrel assembly of claim 10, wherein the groove depth of the first guide groove is deeper than a groove depth of the second end of the at least one second guide groove.

12. The lens barrel assembly of claim 1, wherein the first guide groove comprises:
   a reference position;
   a wide-angle position which is connected to the reference position and is positioned in front of the reference position in the optical axis direction; and
   a telephoto position which is connected to the wide-angle position and is positioned in front of the wide-angle position in the optical axis direction.

13. The lens barrel assembly of claim 12, wherein the at least one second guide groove comprises:
   a wide-angle guide groove comprising a first end separated from the wide-angle position of the first guide groove and a second end connected to the reference position of the first guide groove; and
   a telephoto guide groove comprising a first end separated from the telephoto position of the first guide groove and a second end connected to the first guide groove between the wide-angle position and the telephoto position.

14. The lens barrel assembly of claim 13, wherein the first guide groove further comprises:
   a downward slanting portion and an upward slanting portion formed between the wide-angle position and the telephoto position,
   wherein the downward slanting portion is connected to the wide-angle position and slanted downward in the circumferential direction, and the upward slanting portion is connected to the telephoto position and slanted upward in the circumferential direction.

15. The lens barrel assembly of claim 14, wherein the second end of the telephoto guide groove is connected to the upward slanting portion.

16. The lens barrel assembly of claim 12, wherein when the at least one elastic moving pin is positioned in the reference position of the first guide groove, the first and second barrels overlap each other.

17. The lens barrel assembly of claim 1, wherein:
the first barrel is a lens barrel which supports a first lens group exposed to the outside; and
the second barrel is a cam barrel which is disposed inside the lens barrel.

18. The lens barrel assembly of claim 17, further comprising:
a third barrel which is disposed inside the second barrel and supports a second lens group.

19. The lens barrel assembly of claim 18, wherein:
the third barrel comprises a second elastic moving pin which protrudes outwardly and elastically deforms; and
the second barrel further comprises:
a third guide groove into which the second elastic moving pin is inserted and which extends obliquely in the circumferential direction to guide a movement of the third barrel; and
at least one fourth guide groove comprising a first end separated from the third guide groove and a second end connected to the third guide groove to guide the second elastic moving pin so that the second elastic moving pin returns into the third guide groove when the second elastic moving pin is separated from the third guide groove.

20. The lens barrel assembly of claim 17, wherein the first barrel further comprises a protrusion which protrudes outwardly, and
wherein the lens barrel assembly further comprises an external barrel which is disposed in an outer side of the first barrel and comprises a straight groove, and
the straight groove extends in parallel with an optical axis and into which the protrusion is inserted.

21. A photographing apparatus comprising:
a lens barrel assembly comprising:
a first barrel comprising an elastic moving pin, wherein the elastic moving pin protrudes toward a second barrel and elastically deforms, and
the second barrel comprises:
a first guide groove into which the elastic moving pin is inserted and which obliquely extends in a circumferential direction to guide a movement of the first barrel, and
at least one second guide groove comprising a first end separated from the first guide groove and a second end connected to the first guide groove to guide the elastic moving pin so that the elastic moving pin returns into the first guide groove when the elastic moving pin is separated from the first guide groove,
wherein the second barrel rotates in an optical axis direction and supports the first barrel so that the first barrel moves relative to the optical axis direction; and
an image pickup device which receives light having passed the lens barrel assembly to generate an electrical signal.

\* \* \* \* \*